Patented Dec. 8, 1931                                                                    1,835,867

UNITED STATES PATENT OFFICE

GEORGE W. HEISE, OF MALVERNE, NEW YORK, ASSIGNOR TO NATIONAL CARBON COMPANY, INCORPORATED, A CORPORATION OF NEW YORK

PRIMARY CELLS, AND ELECTROLYTE THEREFOR

No Drawing.         Application filed May 15, 1925.  Serial No. 30,612.

This invention relates to primary batteries, and particularly to that type employing copper oxid and zinc as the electrodes with an alkaline electrolyte. The invention has for its principal object the reduction of the dissolved electrode metal concentration in the electrolyte for the purpose of increasing the service capacity of a given volume of the electrolyte.

By the use of the present invention the service characteristics of cells of the class above-mentioned are improved to a marked degree. The improvement is particularly to be noted in the duration of effective service which can be obtained, and it has been demonstrated that the useful life of the average alkaline primary cell may be increased as much as 30% to 40% or even more, depending on the amount of material added.

The invention is based upon the discovery that certain substances, which are not themselves appreciably soluble in a caustic alkali electrolyte, may combine or react with zinc or other metal dissolved therein to form insoluble products.

It is well known that in the operation of alkaline cells of the type above-mentioned the zinc electrode is gradually dissolved in the electrolyte. The concentration of zinc in the solution increases until the saturation point for the given electrolyte solution is reached, when as the operation of the cell is continued zinc will crystallize and deposit out on the active electrode surfaces. Due to this deposition, the internal resistance of the cell rises until a point is reached where the voltage of the cell falls below that required for efficient operation.

According to the present invention, a substance which serves to reduce the concentration of zinc in the alkaline electrolyte is introduced into the cell either at the time of putting the cell into service or at such time after the beginning of the operation of the cell as may be deemed expedient. Substances which have been found effective for the purpose intended are base-exchanging silicates such as naturally occurring zeolites, permutite, bentonite and the like, and bases such as lime and analogous magnesium compounds. Permutite and bentonite have also been found to be able to take up dissolved copper and hence reduce the zinc corrosion in assembled cells.

While it may appear somewhat surprising in view of the facts heretofore available concerning base-exchanging silicates that these reactions should take place in strong alkali solutions, the results above-mentioned have been substantiated by analytical test. It should also be noted that the base-exchanging reactions here involved are rather slow, but their slowness does not impair their usefulness in this situation since the cells are ordinarily in service for sufficient periods of time to insure that the reaction takes place.

It has been found to be particularly advantageous to carry out the present method in conjunction with the use of addition agents which tend to increase zinc solubility or lessen the formation of adherent crystalline deposits upon the electrodes, as for example the caustic soda wood extract disclosed in the application of Heise and Brokate, Serial No. 619,464, filed February 16, 1923, Patent 1,786,406, December 23, 1930.

While the present invention has been described with particular reference to alkaline cells using zinc and copper oxid electrodes, it is to be understood that it is applicable to primary cells employing acid and neutral electrolytes and that the concentration of other metals than zinc may be reduced in such electrolytes.

It is to be understood that the invention is not limited to the use of the substances above specified, as the use of any substance not appreciably soluble in the electrolyte which will reduce the zinc concentration of the electrolyte is considered to be within the scope of the invention. Further, the improved results obtained by the present invention are not dependent upon the specific procedure described, and various modifications in this procedure may be made within the scope of the present claims.

I claim:

1. A galvanic cell electrolyte comprising caustic alkali and bentonite.

2. An electric cell of the copper oxide type having a positive electrode and a negative electrode and a caustic alkali electrolyte, said cell also containing bentonite in contact with said electrolyte.

In testimony whereof, I affix my signature.

GEORGE W. HEISE.